Oct. 11, 1955
P. ORR ET AL
2,720,120
TRANSMISSION
Filed May 15, 1951
6 Sheets-Sheet 2
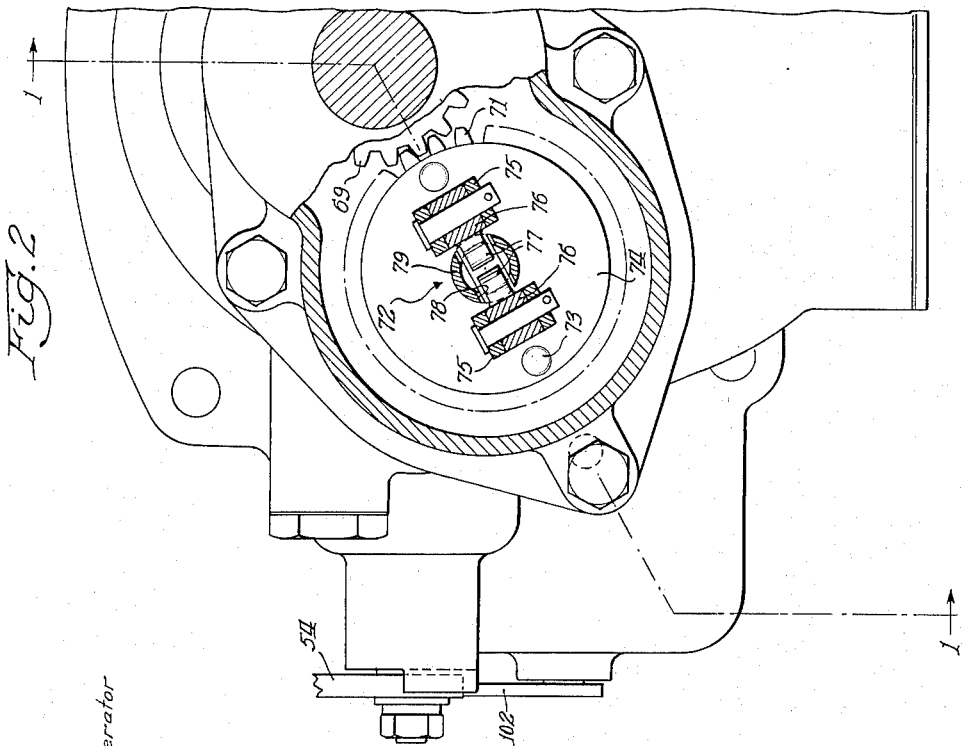
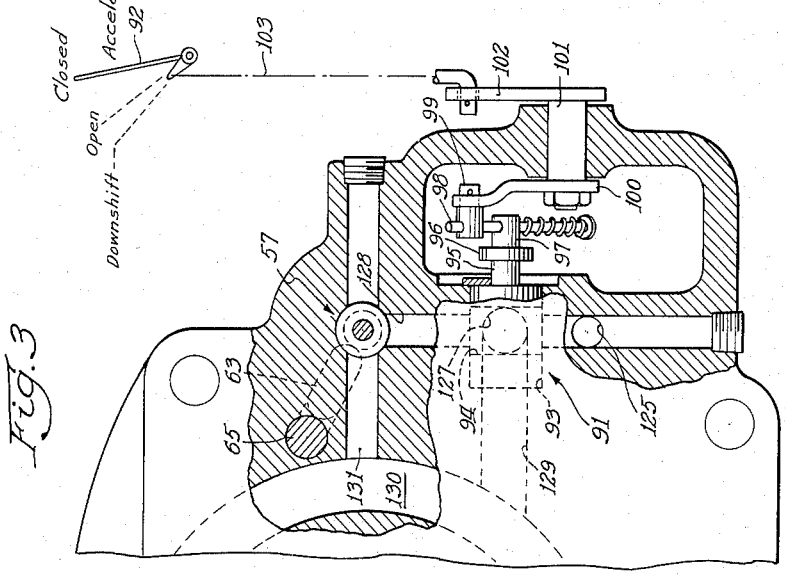
Inventors:
Palmer Orr and
Earl J. Conkle

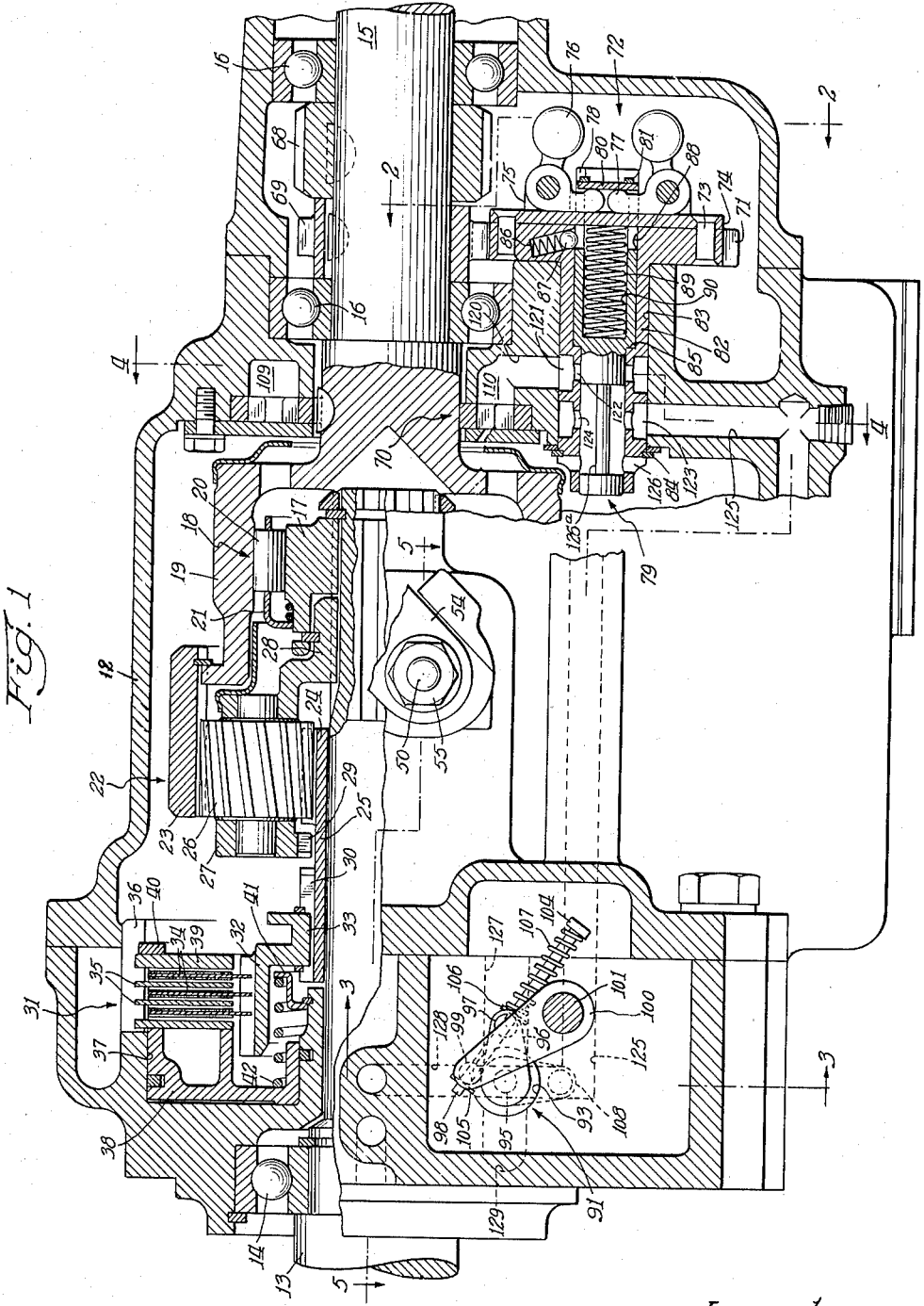

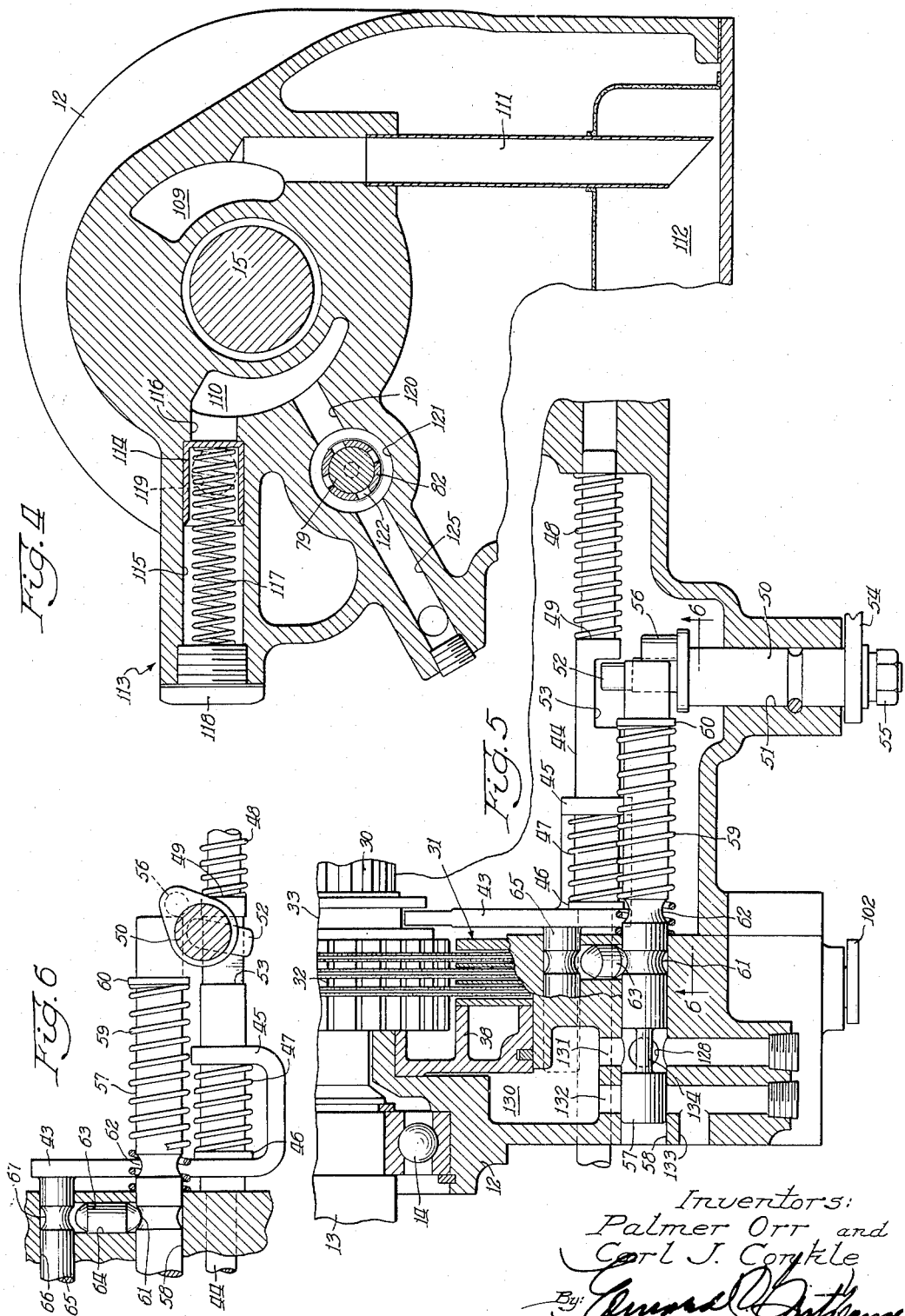

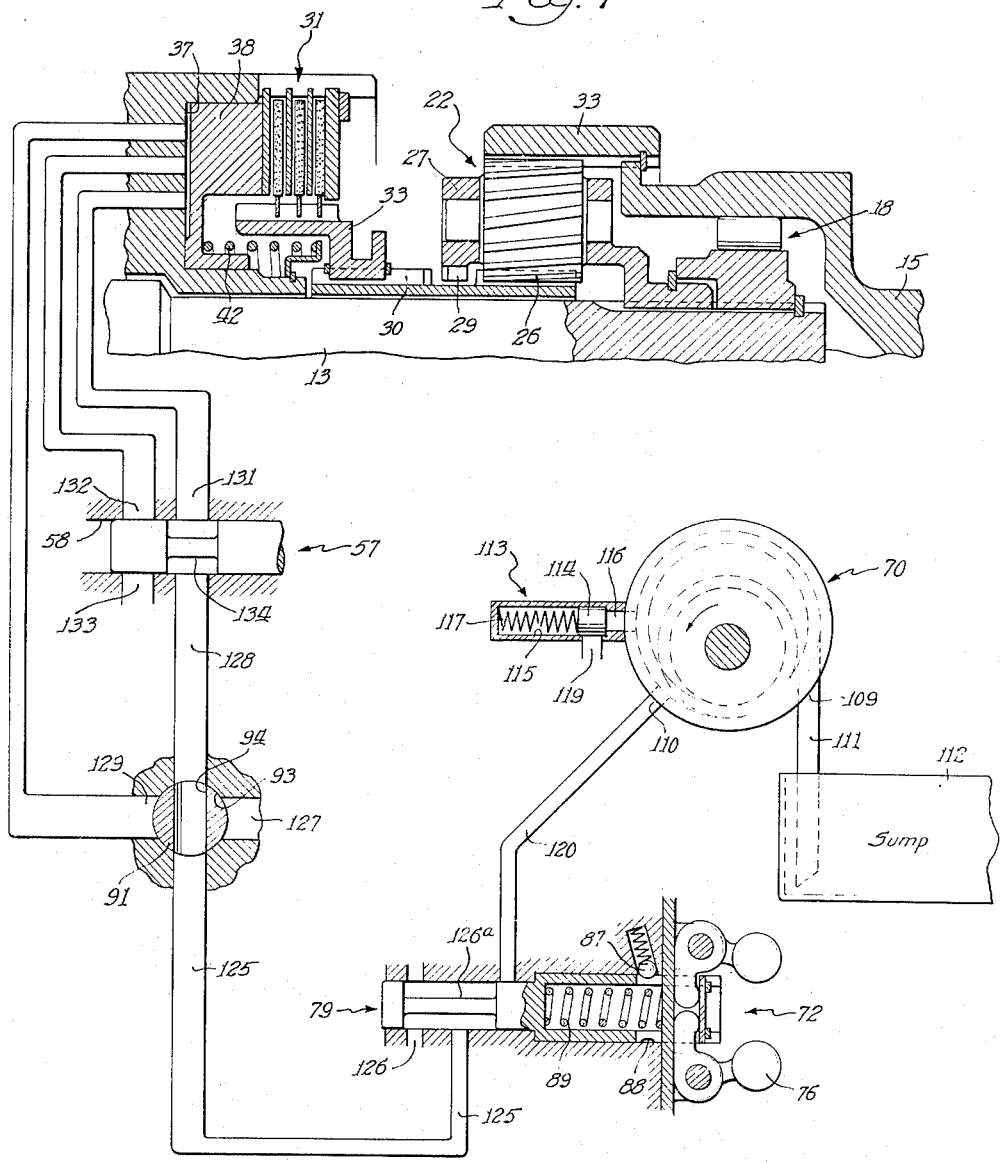

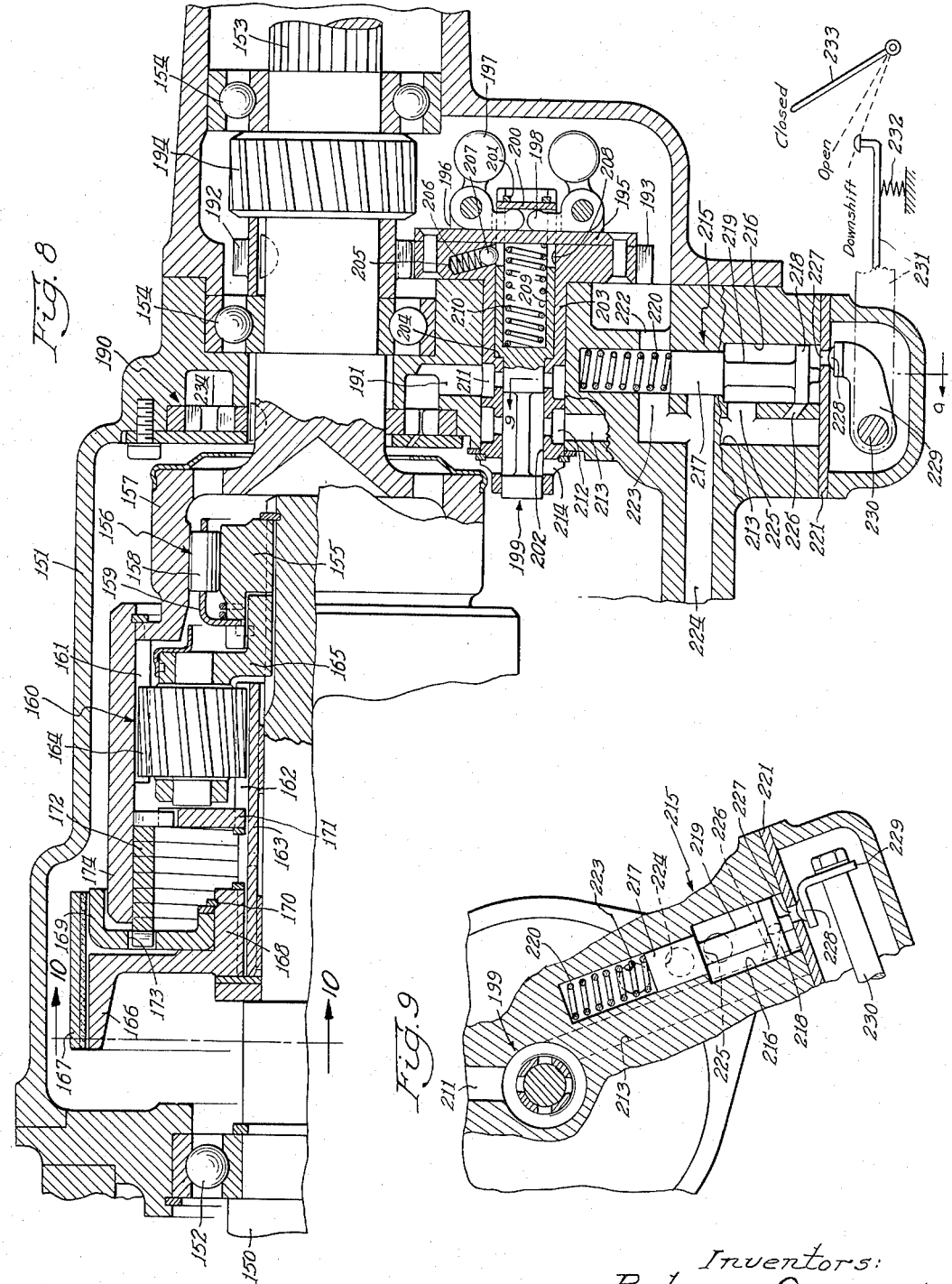

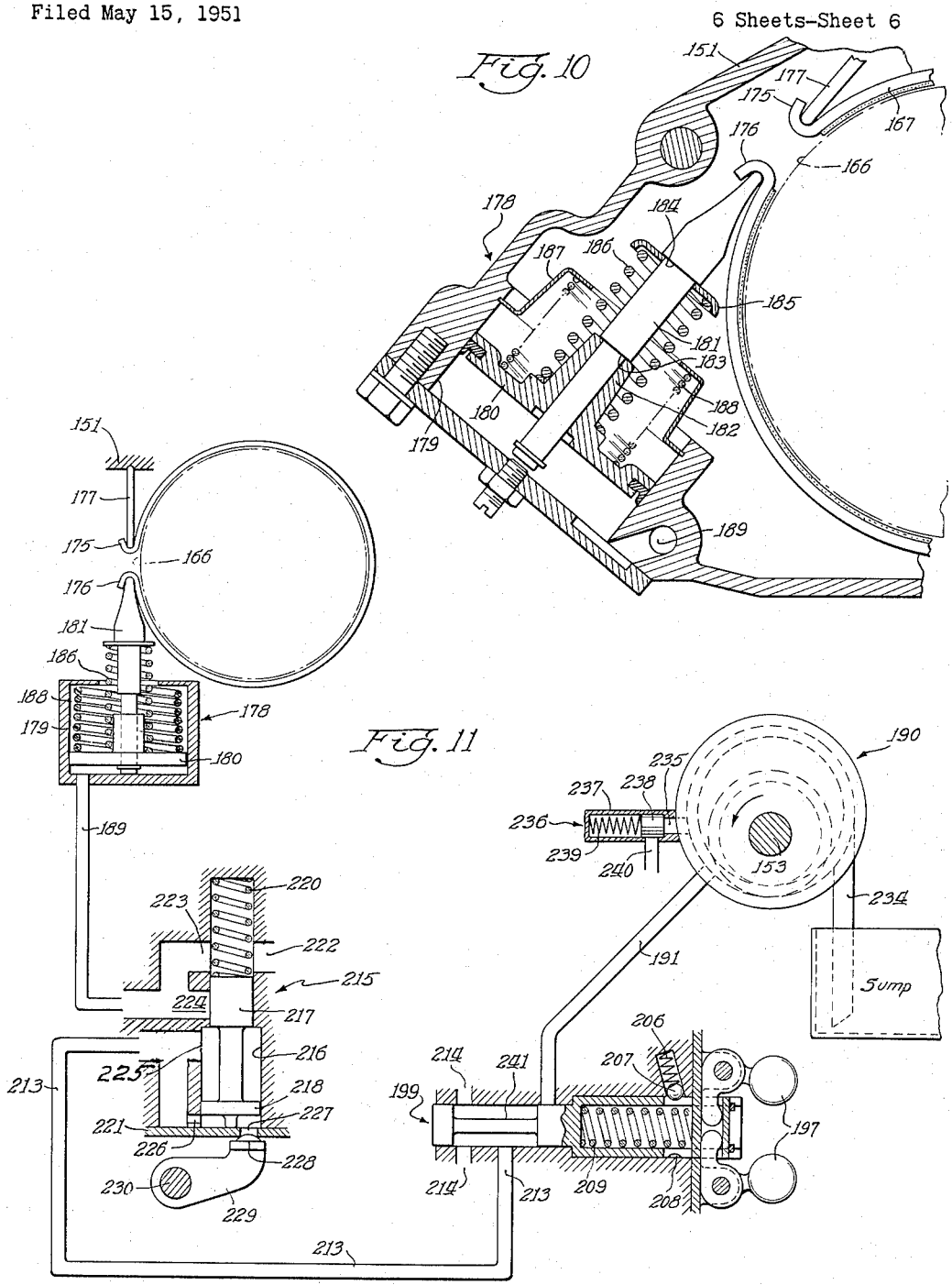

United States Patent Office 2,720,120
Patented Oct. 11, 1955

2,720,120

TRANSMISSION

Palmer Orr and Carl J. Conkle, Muncie, Ind., assignors to The Borg-Warner Corporation, Chicago, Ill., a corporation of Illinois Application May 15, 1951, Serial No. 226,458

4 Claims. (Cl. 74—472)

The present invention relates generally to transmissions and in particular relates to hydraulic control systems for overdrive transmissions of the type designed to be mounted behind a conventional change speed transmission in an automotive vehicle for the purpose of providing an additional higher speed driving ratio to the driven wheels of the vehicle.

Overdrive transmissions in common use at the present time usually employ a planetary gear set mounted between the output shaft of a conventional change speed transmission and the tail shaft which extends to the rear wheels of the vehicle. A one-way clutch directly connects the conventional transmission output shaft which also serves as the overdrive transmission input shaft, with the tail shaft in order to provide a one-way direct drive from the input or drive shaft to the tail shaft. The drive shaft is also connected to rotate in unison with the planet gear carrier of the planetary gear set and when the sun gear of this gear set is held stationary, the ring gear, which is connected to rotate in unison with the tail shaft, rotates at a speed somewhat greater than the speed of the drive shaft. Under this condition the one-way clutch between the drive shaft and tail shaft overruns. Inasmuch as it is undesirable to permit the tail shaft to free wheel or overrun with respect to the drive shaft, it is also conventional practice to provide some type of a clutch between two of the elements of the planetary gear set which functions, upon engagement, to lock up the planetary gear set when the overdrive transmission is operating in direct drive. With this arrangement, a two-way direct drive is established to the vehicle tail shaft.

Two embodiments of the present invention are disclosed herein. The first embodiment employs a positive clutch between the sun gear and the planetary gear carrier of the overdrive planetary gear set, and this clutch is selectively engageable in order to lock up the gear set to provide a two-way direct drive through the transmission. The second embodiment of the present invention utilizes a one-way clutch of the helical spring type which is attached directly to the sun gear and which, when the vehicle is operating under a coast load condition (that is, when the vehicle tends to drive the engine, as when it is coasting down hill), the spring tends to unwind and engage an inner cylindrical surface formed on the ring gear of the gear set. In the latter embodiment the spring type one-way clutch completes a direct drive from the driven shaft to the drive shaft while the conventional roller or sprag type one-way clutch completes a direct drive from the drive shaft to the driven shaft, both of the clutches cooperating to provide a two-way direct drive through the overdrive transmission mechanism.

The main object of the present invention is to provide a hydraulic control circuit for controlling the operation of the braking means associated with the reaction element or sun gear of the overdrive planetary gear set to complete a two-way overdrive to the vehicle tail shaft.

Another object of the invention, closely allied to the preceding object, is to provide a governor controlled valve which functions to prevent engagement of the overdrive transmission brake, so that the overdrive is not completed through the transmission until the speed of the vehicle reaches a predetermined value.

Another object of the invention is to provide a valve which is rendered operable upon depression of the vehicle accelerator pedal to a full open throttle downshift position in order to manually change the drive through the overdrive transmission from an overdrive to a direct drive, irrespective of the speed of rotation of the transmission tail shaft.

A further object of the invention is to provide a manual control for effecting a lock up of the overdrive planetary gear set in order to complete a direct two-way drive through the transmission, wherein the control also functions to move a valve to a position such that disengagement of the overdrive brake mechanism is insured.

The above and numerous other objects and advantages of the present invention will become apparent from the following detailed description when read in conjunction with the accompanying drawings, wherein:

Fig. 1 is an elevational view, partly in section, showing the principal features of one embodiment of the invention and represents a sectional view taken substantially along the line 1—1 in Fig. 2 and looking in the direction of the arrows;

Fig. 2 is a sectional view taken substantially along the line 2—2 in Fig. 1 and looking in the direction of the arrows;

Fig. 3 is a sectional view taken substantially along the line 3—3 in Fig. 1 and looking in the direction of the arrows;

Fig. 4 is a sectional view taken substantially along the line 4—4 in Fig. 1 and looking in the direction of the arrows;

Fig. 5 is a sectional view taken substantially along the line 5—5 in Fig. 1 and looking in the direction of the arrows;

Fig. 6 is a sectional view taken substantially along the line 6—6 in Fig. 5 and looking in the direction of the arrows;

Fig. 7 is a schematic diagram illustrating the hydraulic control circuit utilized in controlling the transmission mechanism shown in Figs. 1–6;

Fig. 8 is a sectional view showing a modified form of the invention;

Fig. 9 is a sectional view taken substantially along the line 9—9 in Fig. 8 and looking in the direction of the arrows;

Fig. 10 is a sectional view taken substantially along the line 10—10 in Fig. 8 and looking in the direction of the arrows; and Fig. 11 is a schematic diagram showing the hydraulic control circuit for controlling the transmission mechanism disclosed in Figs. 8–10.

With reference now to the drawings, wherein like reference numerals in the different views identify identical parts, and with particular reference to the embodiment of the invention disclosed in Figs. 1–7, the overdrive transmission mechanism is enclosed in a casing indicated generally by reference numeral 12. An overdrive transmission drive shaft 13, which, it is contemplated, will be driven by the vehicle engine through a conventional change speed transmission, is rotatably mounted in the casing 12 by means of ball bearing elements 14. A driven shaft or tail shaft 15, which constitutes the driven shaft of the overdrive transmission mechanism, is also rotatably mounted in the casing 12 by means of ball bearing elements 16 and is drivingly connected with the driving wheels (not shown) of the vehicle.

The drive shaft 13 has a collar 17 splined thereto and keyed against longitudinal movement, and this collar comprises the inner race of a one-way clutch 18. The driven shaft 15 has a bell-shaped portion 19 that is mounted concentrically around the collar 17 and this forms the outer race of the clutch 18. Positioned between the races 17 and 19 are a plurality of sprags or rollers 20 which are held in axial alignment by means of a cage 21. The sprags or rollers 20 and the races 17 and 19 are so designed that the clutch 18 is engaged whenever the drive shaft 13 tends to rotate in a forward direction relative to the driven shaft 15 and disengaged whenever the driven shaft 15 tends to rotate forwardly at a higher speed than the drive shaft 13. The operation of the one-way clutch 18 is well-known and further detailed description thereof is deemed unnecessary. It will therefore suffice to say that the clutch 18 is engaged under a drive load condition (when the drive shaft 13 drives the driven shaft 15) and is disengaged under a coast load condition (when the driven shaft 15 tends to rotate at a higher speed than the drive shaft 13).

A planetary gear set 22 is connected between the drive shaft 13 and the driven shaft 15. The planetary gear set 22 comprises a ring gear 23 splined to the bell-shaped extension 19, a sun gear 24 integrally formed on a sleeve shaft 25 which is rotatable and longitudinally slidable with respect to the drive shaft 13, a plurality of planetary pinions 26 which mesh respectively with the ring gear 23 and the sun gear 24 and a planet pinion carrier 27 which has an integral shaft-like extension 28 that is splined to the drive shaft 13. The planet gear carrier 27 is formed on its inner periphery with a plurality of clutch teeth 29 which are designed to mesh with a plurality of corresponding clutch teeth 30, integrally formed on the sleeve shaft 25, when the shaft 25 is moved to the right. The teeth 29 and 30 together comprise a positive clutch which, upon meshing engagement of the teeth 29 and 30, serves to connect the carrier 27 to the sun gear 24 to thereby lock up the planetary gear set 22 in order to establish a two-way direct drive between the drive shaft 13 and the driven shaft 15.

A brake 31 is provided for holding the sun gear 24 stationary to complete an overdrive power train from the drive shaft 13 to the driven shaft 15. The brake 31 includes a sleeve 32 which is integral with a collar portion 33 splined and keyed to the sleeve shaft 25 for the purpose of effecting meshing engagement between the teeth 30 and the teeth 29. A plurality of friction discs 34 are splined to the collar 32 so as to be rotatable therewith. Alternately positioned between the discs 34 are a plurality of discs 35 which are keyed to a cylindrical member 36 integrally formed as part of the casing 12. The casing 12 has an annular cylinder 37 formed therein within which an annular piston element 38 is reciprocable. When fluid under pressure is admitted into the cylinder 37 behind the piston 38, the discs 35 and 34 are compressed against a pressure plate 39, the pressure plate being splined to the member 36 and held against longitudinal displacement by means of an annular key 40. Compression of the discs 35 and 34 between the piston 38 and the pressure plate 39 causes the brake 31 to be engaged and this holds the sun gear 24 stationary to provide the necessary reaction for completing the overdrive from the drive shaft 13 to the driven shaft 15. A retainer ring 41 provides a reaction point for a compression spring 42 which engages the piston 38 and biases it to the left to cause disengagement of the brake 31.

Whenever a two-way direct drive is completed between the drive shaft 13 and the driven shaft 15, or whenever the drive shaft 13 is driven reversely, as when the conventional transmission mechanism with which the present overdrive transmission is associated is conditioned for reverse drive, it becomes necessary to move the clutch teeth 30 into meshing engagement with the teeth 29 to lock up the planetary gear set 22. The means for longitudinally displacing the teeth 30 in order to cause them to mesh with the teeth 29, comprises a bifurcated shift fork 43 which is loosely pivoted upon a lock up rail 44. The fork 43 is bent, as shown in Fig. 6, and includes a collar 45 which is likewise pivotal upon the lockup rail 44. An abutment ring 46 is longitudinally fixed upon the lock up rail 44 and a compression spring 47, concentrically mounted around the rail 44, abuts the ring 46 and the collar 45 in order to hold the fork 43 in the position shown in Fig. 5. Whenever reverse drive through the conventional transmission, mounted in front of the present overdrive transmission, is established, a cam engages the rail 44 and moves it to the right. When the rail 44 is moved in this manner, the compression spring 47 is compressed and biases the shift fork 43 and the collar 33 in a direction tending to engage the teeth 30 with the teeth 29. The lost motion connection afforded by the compression spring 47 is provided in order to enable the shift rail 44 to be moved to its full extent to the right (as viewed in Fig. 5) even though the teeth 30 and 29 may abut one another in end-to-end relationship. Upon movement of the shift rail 44 to the right into its lock up position, the spring 47 functions to move the collar 33 and teeth 30 to the right as soon as the teeth 30 mesh with the teeth 29.

Means are also provided for moving the lock up rail 44 so as to cause engagement of the clutch teeth 30 and 29 whenever it is desired to establish a direct two-way drive between the drive shaft 13 and the driven shaft 15. A compression spring 48, which is mounted concentrically around the lock up rail 44 and positioned between the casing and an enlarged portion 49, formed on the lock up rail 44, tends to bias the lock up rail 44 to its left hand position wherein the teeth 30 are disengaged from the teeth 29. A lock up shaft 50 is rotatable and keyed against longitudinal movement in an opening 51 formed in the casing 12. The lock up shaft is formed with a cam 52 on its inner end that extends into a notch 53 formed in the lock up shift rail 44. A lever 54 is rigidly fastened to the lock up shaft 50 by means of a nut 55 and is designed to be operated by any convenient linkage extending to a point in the vehicle which is easily accessible to the operator thereof. This linkage may also comprise a Bowden wire connection and upon movement of the linkage to one position the shaft 50 and cam 52 occupy the position shown, so that the teeth 30 and 29 are disengaged. Upon movement of the linkage to its other position the shaft 50 is rotated in a counterclockwise direction, whereby the lock up rail 44 is moved to the right against the urging of the compression spring 48, to cause engagement of the clutch teeth 30 and 29.

The lock up shaft 50 is also provided with a second cam 56 for actuating a lock up valve 57. The lock up valve 57 is reciprocable within an opening 58 formed in the casing and is normally biased to its right-hand position (as viewed in Fig. 5) by means of a compression spring 59, positioned between an abutment ring 60 fixed to the valve 57, and a portion of the casing. The lock up valve 57 is provided with a pair of peripheral grooves 61 and 62, which are designed to be engaged by a bean like element 63 positioned within an opening 64 formed in the casing. The shift fork 43 carries a rod 65 which is reciprocable within an opening 66 formed in the casing. The rod 65 is provided with a peripheral groove 67 which is also adapted to cooperate with the bean like element 63. When the lock up shaft 50 is moved in a counterclockwise direction (see Fig. 6) the cam 56 first engages the lock up valve 57 and moves it a short distance to the left. This movement is sufficient to cause the bean like element 63 to be cammed upwardly out of the notch 61 in the valve 57 and into the notch 67 in the rod 65. Limited movement of the valve 57, due to rotation of the cam 56, takes place before the cam 52 strikes the shift rail 44 and this is because of a small amount of lost motion between the cam 52 and the edge of the notch 53 cut in the rail 44. This limited movement of the valve 57 is also sufficient to move the bean like element 63 into the notch 67 before the cam 52 starts to move the rail 44. Thereafter, continued rotation of the lock up shaft 50 moves the valve 57 to the left and the shift rail 44 to the right, but until the notch 62 is opposite the bean like element 63, the bean like element 63 is held in the notch 67 and no shifting movement of the shift fork 43 or of the clutch teeth 30 may be effected. When the valve 57 reaches the position wherein the notch 62 is opposite the bean like element 63, the element 63 then moves into the notch 62 and releases the rod 65 so that the compression spring 47 may move the shift fork 43 and clutch teeth 30 to the right to cause meshing engagement between the teeth 30 and 29. This feature of preventing clutching engagement between the teeth 30 and 29 prior to full movement of the valve 57 will be discussed more fully hereinafter, so that it will suffice to say at this point that disengagement of the brake 31 is insured before the clutch teeth 30 and 29 become engaged. This is important as it prevents the simultaneous establishment of two different two-way drives between the drive shaft 13 and the driven shaft 15.

The driven shaft 15 is provided with a speedometer gear 68 and a governor gear 69, both of which are keyed to the shaft 15, as indicated. The driven shaft 15 also drives a fluid pump, indicated generally by reference numeral 70, which supplies the fluid pressure for effecting engagement of the brake 31.

The governor gear 69 is in continuous mesh with a gear 71 which forms part of a governor 72. Secured to the gear 71 by means of rivets 73 in a plate 74 which is formed with ears 75 that pivotally support a pair of centrifugal weights 76. Each of the weights 76 has an arm 77 that extends into a slot 78 cut near the end of a governor valve 79. The arm 77 abuts a plate 80 positioned within the slot 78 and held therein by means of a snap ring 81. The gear 71 is formed integrally with a sleeve 82 that is rotatably mounted within an opening 83 formed in the casing. The sleeve 82 is fixed axially by means of a snap ring 84. The sleeve 82 carries the valve 79 and a peripheral shoulder 85, which is designed to engage a corresponding shoulder on the valve 79, limits axial movement of the valve 79 to the left. A slot 86 formed in the gear 71 houses a spring-biased ball member 87 which cooperates with a notch 88 formed in the valve 79 to restrain movement of the valve to the right. A compression spring 89 is housed within a bore 90 formed in the valve 79 and abuts the plate 74, thereby continuously urging the valve 79 to its leftward position, as shown in Fig. 1. Upon rotation of the gear 71 and of the weights 76, the weights fly outwardly and the arms 77 tend to move the valve 79 to the right. The detent mechanism 87—88 prevents movement of the valve 79 until the speed of rotation of the governor 72 reaches a predetermined speed that corresponds approximately to a 22 mile per hour vehicle speed. This function of the detent mechanism 87—88 is desirable in order to prevent gradual movement of the valve 79 and consequent partial engagement of the brake 31 as the vehicle speed increases. Such a partial engagement of the brake 31 would tend to wear out the friction discs 34.

A downshift valve 91, which is controlled by the accelerator 92 of the vehicle, is rotatably mounted within an opening 93 formed in the casing. The downshift valve 94 and is adapted to assume either one of two positions which are 90 degrees apart. The valve 81 has a shaft 95 extending therefrom, to which is secured an operating lever 96. The operating lever 96 has a stud 97 formed integral therewith and this is formed with an aperture extending radially therethrough. A rod 98 is reciprocable within the aperture in the stud 97. The rod also extends through an aperture formed in a pivotal stud 99 carried by a lever 100. The lever 100 is pivotally mounted, being rigidly secured to a mounting shaft 101 rotatable in the casing, as is apparent from Fig. 3. The mounting shaft 101 extends outside of the casing and carries an operating lever 102 which is preferably positively connected to the accelerator pedal 92 by means of a linkage indicated by the dot-dash line 103. The rod 98 is formed with an integral collar 104 on one end thereof and has a snap ring 105 secured to the other end. A slidable abutment ring 106 is also mounted on the rod 98 and a compression spring 107 is positioned between the abutment ring 106 and the collar 104. The compression spring 107 functions to retain the snap ring 105 engaged with the lug 99 and the abutment ring 106 engaged with the lug 97, so as to provide a yieldable overcenter connection between the levers 100 and 96.

When the accelerator pedal 92 occupies its closed throttle position, as indicated in Fig. 3, the position of the rod 98 and levers 100 and 96 are as shown in Fig. 1. As the accelerator pedal 92 is depressed from its closed throttle position toward its open throttle position, the lever 100 pivots counterclockwise, thereby moving the rod 98 with it and causing the rod 98 to pivot counterclockwise about the stud 97. As the lever 100 and rod 98 are moved in this manner the rod 98 is pulled slightly to the left, but the compression spring 107 permits such pulling and merely becomes further compressed. It is apparent from Fig. 1 that, upon movement of the lever 100 through an arc of approximately 90 degrees, the longitudinal axis of the rod 98 moves past the longitudinal axis of the lever 96. This condition is reached when the accelerator pedal 92 is moved to its downshift position (indicated in Fig. 3), and at this time the compression spring 107 pushes against the stud 97 thereby pivoting the lever 96 in a clockwise direction to the position indicated by the dotted line 108 (Fig. 1). The dotted line position 108 of the lever 96 corresponds to the position of the valve 91 when it is so positioned as to cut off the supply of fluid pressure to the brake operating cylinder 37 and the full line position of the lever 96 corresponds to the position of the valve 91 when it is so positioned as to permit engagement of the brake 31. It is therefore seen that the levers 96 and 100 and the rod 98 altogether comprise an overcenter device which is effective to move the valve 91 from a brake engaging position to a brake disengaging position when the accelerator pedal 92 is moved to its full open throttle downshift position.

When the valve 91 occupies its downshift or brake disengaging position the rod 98 assumes a position such that the spring 107 urges the lever 96 in a clockwise direction. Upon release of the accelerator pedal, so that the lever 100 moves in a clockwise direction, the rod 98 pivots clockwise along with the stud 97 and upon the accelerator pedal 92 reaching a position, somewhere between open and closed throttle position, the longitudinal axis of the rod 98 moves past the longitudinal axis of the lever 96 so that immediately thereafter the compression spring 107 functions to push the stud 97 and lever 96 in a counterclockwise direction to the position shown in full lines in Fig. 1. This movement of the lever 96 again returns the valve 91 to its brake engaging position so that reengagement of the brake 91 to again establish the overdrive condition between the shafts 13 and 15 is then permitted.

The hydraulic control mechanism for the first embodiment of the invention will now be described. As was stated previously, the fluid pump 70 is of conventional construction and includes an inlet port 109 and an outlet port 110. Fluid is drawn into the inlet port 109 through a conduit 111 which is in communication with a fluid sump 112. The pump 70 functions to maintain a supply of fluid under pressure in the outlet port 110. A relief valve 113 comprises a piston 114 reciprocable within a cylinder 115. The piston 114 is biased into a position so as to close off a relief conduit 116 by means of a compression spring 117 that is positioned between the piston 114 and a plug 118. The relief valve 113 functions to regulate the pressure of the fluid in the outlet port 110 in the following manner. Fluid under pressure from the outlet port 110 enters the conduit 116 and tends to move the valve 114 in opposition to the compression spring 117. If the pressure of the fluid is sufficiently high the piston 114 is moved so as to uncover a vent port 119. When the vent port 119 is uncovered, the pressure of the fluid in the outlet port 110 decreases and the compression spring 117 returns the piston 114 to the right to again close the vent port 119. Fluid passing out through the vent port 119 serves to lubricate the gearing.

The outlet port 110 communicates with a conduit 120 which itself is in communication with an annular groove 121 formed in the sleeve 82. Circumferentially spaced apertures 122 formed in the sleeve 82 permit communication between the annular groove 121 and the inside of the sleeve 82.

When the governor 72 is rotating at a speed which is insufficient to overcome the detent 87—88 and the compression spring 89, the valve 79 occupies the position shown in Fig. 1. As is apparent, the valve 79, at this time functions to close the apertures 122 and this prevents the passage of fluid beyond the valve 79. The sleeve 82 is also provided with a second annular groove 123 which communicates with the inside of the sleeve 82 by means of circumferentially spaced apertures 124 formed in the sleeve 82. The groove 123 is also in continuous communication with a conduit 125. A plurality of bleed apertures 126 are also formed in the sleeve 82. The valve 79 is provided with an annular groove 126a and when the valve occupies the position shown in Fig. 1 the conduit 125 communicates with the bleed apertures 126 through the groove 123, apertures 124 and groove 126a.

The conduit 125 extends to the opening 93 within which the downshift or kickdown valve 91 is positioned. Besides being in communication with the conduit 125, the opening 93 also communicates respectively with conduits 127, 128 and 129 all of which extend radially from the opening 93 and which are each approximately 90 degrees apart. The conduit 127 is a bleed conduit, the conduit 128 extends to the opening 58 within which the lock up valve 57 is reciprocable, and the conduit 129 communicates with a chamber 130 which is coextensive with the cylinder 37. When the downshift valve 91 occupies its brake engaging position (as shown in Fig. 7) the conduits 125 and 128 are in communication with each other. When the valve 91 occupies its brake disengaging position or downshift position it is rotated through 90 degrees and effects communication between the conduits 129 and 127 so as to bleed the brake operating cylinder 37.

The lock up valve opening 58, with which the conduit 128 communicates, also is in communication with three other conduits 131, 132 and 133. Both of the conduits 131 and 132 communicate with the chamber 130 and the conduit 133 is a bleed conduit. The valve 57 is formed with a peripheral groove 134 which functions to interconnect the conduits 128 and 131 when the lock up valve 57 occupies its overdrive position (the position shown in Fig. 5) and when this valve is moved to the left by the lock up mechanism so that the bean like element 63 becomes seated in the groove 62, there is no longer any communication between the conduits 128 and 131 but communication is established between the conduits 132 and 133 in order to bleed the chamber 130.

The following is a description of the operation of the invention disclosed in Figs. 1–7.

When the vehicle change speed transmission mechanism, with which the present invention is associated, is conditioned for forward speed drive a direct one-way drive from the drive shaft 13 to the driven shaft 15 is completed through the one-way engaging device 18. Rotation of the driven shaft 15 causes the governor 72 to also rotate, but until the speed of rotation of the driven shaft 15 increases sufficiently to cause a corresponding vehicle speed of approximately 22 miles per hour, the governor weights 76 are ineffective to move the governor valve 79 out of the position shown in Fig. 1, the detent mechanism 87—88 functioning to retain the valve 79 in this position until the centrifugal weights 76 exert a sufficient force to move the valve 79 into a position to completely open the apertures 122 and close the apertures 126. Thus, until the governor valve 79 is moved out of the position shown in Fig. 1, the brake mechanism 31 is disengaged so that the overdrive power train through the planetary gearing 22 may not be established between the shafts 13 and 15. Under this condition of operation a bleed circuit extending from the chamber 130 which is in communication with the brake operating cylinder 37, extends through the conduit 131, groove 134 in the valve 57, conduit 128, aperture 94 in the downshift valve 91, conduit 125 and groove 127 in the governor valve 79 to the bleed conduits 126. As will be noted, the other two possible bleed circuits for the chamber 130 are closed at this time. One of these other two bleed circuits extends from the chamber 130 through the conduit 132, through the groove 134, when the valve 57 assumes its lock up position, and out through the bleed conduit 133. The other bleed circuit extends from the chamber 130, through the conduit 129, through the aperture 94, when the downshift valve 91 assumes its downshift position and out through the bleed passage 127.

When the lock up valve 57 and the downshift valve 91 occupy the positions shown in Fig. 7, an increase in the speed of the driven shaft 15 to a speed corresponding to a vehicle speed of approximately 22 miles per hour causes the governor to rotate at a speed sufficiently high to overcome the detent mechanism 87—88 and the compression spring 89. The valve 79 is thereupon moved to the right so that the bleed apertures 126 are closed and the groove 127 interconnects the conduits 120 and 125. Under this condition fluid under pressure from the outlet port 110 in the pump 70 passes through the conduit 120, groove 127, conduit 125, opening 94 in the downshift valve 91, conduit 128, groove 134 in the lock up valve 57 and through the conduit 131 to the chamber 130 and cylinder 37. The fluid pressure thus applied to the cylinder 37 moves the piston 38 such that the discs 35 and 34 are compressed against the pressure plate 39. The brake 31 is thereby engaged so that the sun gear 24 is held stationary. With the sun gear 24 held stationary, rotation of the planet gear carrier 27 effects an overdrive of the ring gear 23 and output or driven shaft 15.

When the transmission mechanism is operating in overdrive it is possible at any time for the operator of the vehicle to effect a kickdown from overdrive to direct drive condition. In order to effect this kickdown or downshift, it is only necessary for the operator to move the accelerator pedal 92 to its full open throttle downshift position. Movement of the accelerator pedal in this manner causes the downshift valve 91 to be rotated through approximately 90 degrees so as to break the pressure connection to the cylinder 37 through the conduits 125 and 128, and to establish a bleed circuit to the cylinder 37. This bleed circuit extends from the chamber 130 through the conduit 129 and through the aperture 94 to the bleed passage 127. Such bleeding of the brake cylinder 37 permits the compression spring 42 to move the piston 38 to the left to cause disengagement of the brake mechanism 31. The sun gear 24 is no longer held stationary so that the overdrive connection between the shafts 13 and 15 is broken. The direct one-way drive from the drive shaft 13 to the driven shaft 15, through the overrunning clutch mechanism 18, is thereupon automatically established.

Whenever the vehicle with which the present transmission mechanism is associated is conditioned for reverse drive, it is necessary that the positive clutch teeth 30 and 29 be engaged. This is because of the fact that the drive shaft 13 is driven in a reverse direction and this causes the overrunning clutch mechanism 18 to continuously overrun thus making it impossible to establish a reverse drive between the shafts 13 and 15 through the clutch mechanism 18. When the conventional change speed transmission mechanism is conditioned for reverse drive the main vehicle clutch is disengaged and consequently there is no rotation of the tail shaft 15 and pump 70. Because of the fact that the pump 70 is not operating, no fluid pressure is supplied to the conduit 120. Further, inasmuch as the tail shaft 15 is not rotating, the governor weights 76 assume the position shown in Figs. 1 and 7 so as to complete the bleed passage from the brake 31. When the change speed transmission mechanism is conditioned for reverse drive the reverse shift fork (not shown) has a cam, which is also not shown, that strikes the left end of the lock up rail 44 to move the lock up rail to the right against the urging of the compression spring 48. This movement of the lock up rail 44 functions, through the compression spring 47, to move the shift fork 43 and collar 33 to the right, thereby effecting an engagement between the clutch teeth 30 and 29. The planet pinion carrier 27 is thus positively connected with the sun gear 24 so as to lock up the planetary gear set 22. The reverse rotation of the drive shaft 13 is thereby transmitted through the planetary gear set 22, which rotates as a unit, to the ring gear 23 and output shaft 15. During reverse drive the tail shaft 15 rotates reversely and because of this fact the pump 70 likewise rotates reversely and cannot supply any fluid pressure to the normal output port 110. Thus, even though the governor might rotate at a sufficiently high speed to overcome the compression spring 89 and detent mechanism 87—88, there is still no fluid pressure for causing engagement of the brake mechanism 31. Thus the brake mechanism never becomes engaged as long as the tail shaft 15 rotates reversely. This is a very important safety feature because the simultaneous engagement of the brake 31 and the positive clutch 30—29 would otherwise tend to establish two power trains between the shafts 13 and 15 at the same time which would obviously result in a breakage of parts.

When the operator of the vehicle desires that a positive two-way direct drive be established from the drive shaft 13 to the driven shaft 15, irrespective of the speed of rotation of the driven shaft 15, it is only necessary that he operate the mechanism for effecting rotation of the lock up shaft 50. It will be recalled that during the first part of the rotation of the lock up shaft 50, the cam 56 strikes the lock up valve 57 and moves it to the left sufficiently so that the bean like element 63 is moved out of the notch 61 and into the notch 67 in the rod 65. The lost motion between the cam 52 and the notch 53 formed in the lock up rail 44 is then taken up and further rotation of the shaft 50 serves only to compress the spring 47 against the collar 45, and eventually to move the lock up valve 57 to the left until the bean like element 63 is opposite the groove 62. The bean like element 63 then falls into the groove 62 and this permits the compression spring 47 to urge the shift fork 43 and shift collar 33 to the right to cause engagement of the clutch teeth 30 and 29. When the lock up valve 57 assumes the position wherein the bean like element 63 is seated in the notch 62, the groove 134 in the lock up valve 57 is opposite the conduits 132 and 133, and the interconnection between the conduits 131 and 128 is broken. Thus the pressure supply line through the conduits 128 and 131 to the brake cylinder 37 is broken so that no fluid pressure can be applied to the brake piston 38. The brake cylinder 37 is at this time bled over a bleed circuit extending from the chamber 130 through the conduit 132 and groove 134 to the bleed passage 133. So long as the lock up shaft 15 occupies the position into which it has been moved manually by the operator of the vehicle, the gear set 22 is locked up and a positive two-way direct drive remains established from the drive shaft 13 to the driven shaft 15.

When the two-way direct drive power train is established between the shafts 13 and 15 because of the locking up of the gear set 22, the operator of the vehicle may condition the present transmission mechanism for overdrive by merely returning the operating lever for the lock up shaft 50 to its overdrive position. This causes the lock up lever 50 to be rotated in such a manner as to disengage the cams 56 and 52 respectively from the lock up valve 57 and the end of the notch 53 in the lock up rail 44. The compression spring 48 then moves the lock up rail 44 to the left to cause disengagement of the clutch 30 and 29, until the notch 67 is opposite the bean like element 62. At this time the compression spring 59 is able to move the lock up valve 57 to the right in order to cam the bean like element 63 out of the notch 62 and thus permit full movement of the lock up valve 57 to its right-hand or overdrive position. The bleed circuit through the conduits 132 and 133 is thereupon broken and the pressure supply circuit to the brake cylinder 37 is again completed through the conduit 128, groove 134 and conduit 131. If the tail shaft is rotating at a speed sufficiently high, at this time, to cause movement of the governor controlled valve 79 to its overdrive position, an overdrive power train immediately becomes established. If, however, the governor 72 is not rotating sufficiently fast to have moved the governor valve 79 to its overdrive position, then a bleed circuit for the brake operating cylinder 37 is established through the conduit 125, groove 127 and bleed passages 126.

The embodiment of the invention disclosed in Figs. 8–11 is quite similar to the embodiment disclosed in Figs. 1–7, the essential difference between the two embodiments being that in the second embodiment a helical spring type one-way clutch mechanism is employed for interconnecting two elements of the planetary gearing whenever the driven shaft tends to drive the drive shaft, so that the direct drive through the transmission mechanism is a two-way drive under all conditions.

With reference to the drawings of the second embodiment of the invention, a drive shaft 150, which may constitute the driven shaft of a conventional change speed transmission, is rotatably mounted within a casing indicated generally by reference numeral 151 by means of ball bearing elements 152, and a driven shaft 153, which it is contemplated will be connected to drive the driving wheels of an automotive vehicle, is rotatably mounted in the casing 151 by means of ball bearing elements 154. A collar 155 is splined and keyed to the drive shaft 150 and constitutes the inner race of a one-way engaging device or clutch 156. The outer race of the one-way clutch 156 comprises a bell shaped member 157 integrally formed on the inner end of the driven shaft 153, and the members 157 and 155 are designed to be interconnected by means of rollers or sprags 158 which function to transmit a drive from the drive shaft 150 to the driven shaft 153 which overruns whenever the driven shaft 153 tends to rotate forwardly with respect to the drive shaft 150. The sprags or rollers 158 are maintained in axial and peripheral alignment by means of a cage 159 splined to the collar 155. Further detailed description of the one-way clutch 156 is not deemed necessary as the construction and operation of this type of clutch is well-known.

A planetary gear set 160 is also interconnected between the shafts 150 and 153 and comprises a ring gear 161 splined to the bell shaped member 157, a sun gear 162 integrally formed on a short sleeve shaft 163 that is concentrally mounted around the drive shaft 150, a plurality of planetary pinions 164 which mesh respectively with the ring gear 161 and the sun gear 162 and a planetary pinion carrier 165, splined to the drive shaft 150 and rotatably supporting the pinions 164. When the sun gear 162 is held stationary and the carrier 165 is driven in a forward direction, the ring gear 161 and the driven shaft 153 rotate at an overdrive with respect to the drive shaft 150, the one-way clutch 156 overrunning during this condition.

Splined and keyed to the sleeve shaft 163, and provided for the purpose of holding the sun gear 162 stationary, is a brake drum 166 which is engageable by a brake band 167. The brake drum 166 is formed with an axially extending portion 168 which rotatably mounts an annular drum element 169. The drum element 169 is normally free to rotate with respect to the drum 166 but is keyed against axial displacement therefrom by means of a key 170.

The sun gear 162 has an annular ring 171 keyed and splined thereto and one end of a helical spring 172 is carried by this ring. The other end of the helical spring 172 is positioned within an aperture 173 formed in the drum element 169. When the helical spring 172 is expanded its convolutions engage the inner cylindrical surface formed in an extension 174 on the ring gear 161.

The helical spring 172 functions as a one-way clutch between the ring gear 161 and the sun gear 162 to thereby lock up the planetary gear set 160 whenever the driven shaft 153 tends to overrun the drive shaft 150. When the driven shaft 153 tends to overrun the drive shaft 150 the ring gear 161 tends to rotate forwardly with respect to the carrier 165. This tendency of the ring gear 161 to rotate forwardly with respect to the carrier 165 causes the sun gear 162 to tend to rotate reversely. Thus there is a tendency for the ring gear 161 to rotate forwardly while there is an opposite tendency for the sun gear 162 to rotate reversely. During this condition of operation the frictional drag of the inner cylindrical surface on the extension 174 causes the helical spring 172 to expand slightly until its convolutions wedge against the inner cylindrical surface of the extension 174. When this wedging action occurs the convolutions of the spring 172 so engage the inner surface of the extension of the ring gear that the ring gear and sun gear are locked together to cause the planetary gear set 160 to rotate as a unit, thereby transmitting the drive from the driven shaft 153 to the drive shaft 150. Contraction of the band 167 causes it to initially engage the drum element 169 before engaging the drum 166. Inasmuch as the sun gear 162 and the helical spring 172 are rotating in a forward direction at substantially the same speed as the shafts 150 and 153, immediately prior to the contraction of the band 167, the engagement of the band 167 with the drum element 169 slows down one end of the spring 172 while the other end continues to tend to rotate forwardly. This causes the spring 172 to be wound up, thereby contracting the spring and bringing its convolutions into disengaged relation with respect to the inner cylindrical surface on the extension 174 of the ring gear 161. The ring gear 161 is thereby disengaged from the sun gear 162 and upon further contraction of the brake band 167, it engages and holds stationary the drum element 166. The sun gear 162 is thus held stationary and the overdrive condition between the drive shaft 150 and the driven shaft 153 is completed.

With reference now to Fig. 10, the ends 175 and 176 of the brake band 167 are each bent to form a U-shaped strut receiving member. A strut 177 abuts the end 175 of the band 167 and also abuts the frame 151 in order to transmit the reaction to the frame 151 when the band is engaged.

A fluid pressure operated motor 178 is provided for engaging the band 167 against the drum 166. This motor 178 comprises a cylinder 179 formed in the casing 151 and a piston 180 which is reciprocable within the cylinder. The piston 180 is formed with a central aperture for receiving a shaft or piston rod 181 and an axially extending peripheral flange 182 acts as a stop for the rod 181 whenever a shoulder 183 thereon abuts the end of the flange 182. The rod 181 also has another shoulder 184 against which a pressure ring 185 is seated. A compression spring 186 is positioned between the pressure ring 185 and the piston 180. Another annular pressure ring 187 is mounted in the casing and a compression spring 188 is positioned between the pressure ring 187 and the piston 180. A fluid pressure conduit 189 communicates with the cylinder 179 in order to admit a supply of fluid pressure behind the piston 180. When fluid pressure is applied behind the piston 180 the piston moves forwardly in the cylinder 179, carrying with it the rod 181, which rod abuts the end 176 of the brake band 167 and thereby compresses the brake band until it engages the drum 166. When fluid under pressure is not being supplied to the cylinder 179, both springs 186 and 188 urge the piston 180 to its inoperative position, in order to effect disengagement between the band 167 and the drum 166.

The driven shaft 153 drives a fluid pump 190 which supplies fluid pressure to the conduit 191. The driven shaft 153 is also provided with a gear 192 which drives a governor gear 193, and with a speedometer gear 194. The governor gear 193 has a plate 195 riveted thereto which has two sets of ears 196 for pivotally mounting a pair of governor weights 197. The governor weights 197 have arms 198 which extend through slots (not shown) in a governor valve 199 and engage a plate 200 retained in the valve by means of a stop ring 201. The valve 199 is mounted within an axially extending opening 202 formed in a sleeve portion 203 integral with the governor gear 193. A stop shoulder 204 formed in the sleeve 203 limits movement of the valve 199 to the left. The gear 193 is formed with a slot 205 within which a spring 206 and ball 207 are mounted. The ball 207 cooperates with a notch 208 formed in the valve 197 to thereby tend to retain the valve 199 in the position shown. The valve 199 is bored as indicated at 209 and receives a compression spring 210 that abuts the plate 195 and continuously biases the valve 199 toward the position in which it is shown in Fig. 8.

The sleeve 203 is provided with a pair of peripheral grooves 211 and 212 which communicate respectively with the conduit 191 and with conduit 213. Both of the grooves 211 and 212 communicate with the interior of the sleeve 203 through radially extending apertures formed in the sleeve. The sleeve 203 is also formed with a plurality of radially extending apertures or bleed ports 214 communicating respectively with the inner part of the sleeve 203 and with the interior of the casing 151.

An accelerator controlled valve 215 is mounted within a suitable opening 216 formed in the casing and comprises a pair of lands 217 and 218 which are separated by means of a groove 219. A compression spring 220 is mounted within the opening 216 and functions to bias the valve 215 towards the position shown against an end plate 221. A plurality of conduits 222, 223, 224, 225 and 226 respectively communicate with the opening 216 which houses the valve 215. The conduit 222 is a bleed conduit, the conduit 223 is connected with the conduit 224 which communicates with the conduit 189 leading to the motor 178, and both conduits 225 and 226 communicate with the conduit 213. The plate 221 has an aperture 227 therein which is normally closed by means of a seal 228 carried by an accelerator actuated lever 229. The lever 229 is fixed to a shaft 230 and a spring biased accelerator actuated lever 231 is also fixed to the shaft 230. The levers 231 and 229 are normally biased to the positions shown in Fig. 8 by means of a compression spring 232, but upon movement of the accelerator pedal 233 to its full open throttle downshift position the levers 231 and 229 are pivoted clockwise (as viewed in Figs. 8 and 11) to disengage the seal 228 from the opening 227 and permit fluid within the opening 216 to bleed through the opening 227.

Upon rotation of the driven shaft 153, the pump 190 operates to draw fluid through an inlet conduit 234 and pumps this fluid out into a relief conduit 235 and into the conduit 191 leading to the governor valve 199. The relief conduit 235 leads to a relief valve 236 which comprises a cylinder 237, a piston 238 and a compression spring 239 which tends to urge the piston 238 toward a position to cover up a vent conduit 240. The vent conduit 240 leads to the planetary gearing 160 and thus when the fluid pressure supplied by the pump is sufficient to overcome the compression spring 239 the piston 238 is moved so as to uncover the vent conduit 240 and supply fluid for lubricating the planetary gearing. Under the conditions of operation shown in Fig. 11 the governor weights 197 are not rotating sufficiently fast to overcome the compression spring 209 and detent 206—208. Therefore, at this time, the valve 199 blocks the conduit 191. Also under these conditions the conduit 213 communicates with the bleed apertures 214 through the groove 241 formed in the valve 191 in order to bleed fluid from the conduits 225 and 226 and from the opening 216 beneath the land 217. The spring 220 is thus effective to retain the valve 215 in the position shown. With the valve 215 in this position a bleed circuit is established for the motor 178 which extends from the cylinder 179 through the conduits 189, 224 and 223 and thence through the opening 216 and out through the bleed passage 222. Therefore the brake band 167 is disengaged from the drum 166 at this time, and a direct drive is established from the drive shaft 150 to the driven shaft 153 through the one-way clutch 156.

When the speed of the driven shaft 153 increases sufficiently to cause the weights 197 to move the governor valve 199 to the right, the groove 241 moves over to interconnect the conduits 191 and 213, and the valve 199 then blocks the bleed apertures 214. Fluid under pressure is then supplied to the conduit 213 and thence through the conduits 225 and 226 into the opening 216. The fluid pressure entering the opening 216 through the conduit 225 acts on both lands 217 and 218, the combined effect of which tends to move the valve toward the position as shown. The fluid pressure entering the opening 216 below the land 218, however, acts upon this land and tends to move the valve 215 upwardly. The combined effect of the fluid pressure acting on the land 217 and on both sides of the land 218 is sufficient to move the valve 215 upwardly, thereby overcoming the compression spring 220. When the valve 214 reaches its upper position the land 217 closes the conduits 222 and 223, and the groove 219 interconnects the conduits 225 and 224. The fluid pressure in the opening 216 is then transmitted through the groove 219 and conduit 224 into the conduit 189 and from there into the cylinder 179 behind the piston 180 in order to cause engagement of the brake band 167 with the drum 166. This engagement of the band with the drum 166 automatically disengages the helical spring clutch and is effective to hold the sun gear 162 stationary in order to establish the two-way overdrive between the drive shaft 150 and the driven shaft 153.

In this embodiment of the invention it is not necessary to have any separate lock up means, such as a positive clutch, which is effective to lock up the planetary gear set 160 during the establishment of reverse drive to the driven shaft 153. During reverse drive the drive shaft 150 is rotated reversely and as long as the drive shaft 150 is being driven by the engine or by a conventional transmission mechanism in front of the overdrive gearing the one-way clutch 156 over-runs. The helical spring clutch between the ring gear 161 and the sun gear 162, however, is effective to lock up the planetary gear set 160 to thereby transmit the reverse drive to the driven shaft 153. If the driven shaft 153 tends to overrun the drive shaft 150 reversely, the one-way clutch 156 is then effective to transmit a reverse drive from the driven shaft 153 to the drive shaft 150.

When the present transmission mechanism is operating in overdrive and the operator of the vehicle desires to downshift the transmission from overdrive to a direct forward drive between the drive shaft 150 and the driven shaft 153 it is only necessary that the accelerator pedal 233 be moved into its full open throttle downshift position. This movement of the accelerator pedal pivots the levers 231 and 229, thereby moving the seal 228 away from the aperture 227. The fluid pressure in the opening 216 beneath the land 218 is thereby drained off and is no longer effective to retain the valve 215 in its upper or overdrive position. The compression spring 220 is then effective to return the valve 215 to the position as shown in Figs. 8 and 11. As was stated previously, with the valve 215 in this position a bleed circuit is completed for the operating cylinder 179 through the conduits 189, 224 and 223 and thence through the opening 216 to the bleed passage 222. The brake band 167 is then disengaged from the drum 166 and a direct drive between the drive shaft 150 and 153 is again established. If the operator of the vehicle then desires to again upshift the transmission mechanism from direct drive to overdrive, all that need be done to effect such a shift is to release the accelerator pedal 233 slightly until it reaches such a position as will permit the levers 231 and 229 to pivot counterclockwise sufficiently to bring the seal 228 into engagement with the aperture 227. Fluid under pressure is then again applied to the lower side of the land 218 and causes the valve 215 to be restored to its overdrive position wherein the brake band 167 is engaged with the drum 166.

It is contemplated that numerous changes and modifications may be made in the present invention without departing from the spirit or scope thereof.

We claim:

1. In transmission mechanism for an engine driven device, the combination of a drive shaft, a driven shaft, means for providing a first power train between said shafts and including a gear set, a brake for an element of the gear set to complete said power train when the brake is engaged, one-way engaging means for completing a second power train from said drive shaft to said driven shaft, means effective to lock up said gear set to complete a power train of the same ratio as said second power train from said driven shaft to said drive shaft, the engine being effective to drive the drive shaft, an accelerator for controlling the speed of the engine and movable to a limit position, means for actuating said brake to cause engagement thereof and completion of said first power train, means responsive to the speed of said driven shaft for rendering said actuating means ineffective to cause engagement of the brake and completion of the first power train below a predetermined speed of the driven shaft, means actuated by said accelerator upon movement thereof to its said limit position for rendering said actuating means ineffective irrespective of the speed of the driven shaft, and means controlled by said lock-up means for rendering said actuating means ineffective to cause engagement of said brake so long as the power train from the driven shaft to said drive shaft is completed.

2. In transmission mechanism for an engine driven device, the combination of a drive shaft, a driven shaft, means for providing a first power train between said shafts and including a gear set, a fluid pressure operated brake for an element of the gear set to complete said first power train when the brake is engaged, one-way engaging means for completing a second power train from said drive shaft to said driven shaft, means effective to lock up said gear set to complete a power train of the same ratio as the second power train from said driven shaft to said drive shaft, the engine being effective to drive the drive shaft, an accelerator for controlling the speed of the engine and movable to a limit position, means for supplying a fluid pressure for actuating said brake to cause engagement thereof and completion of said first power train, a valve positionable in response to the speed of said driven shaft for rendering said fluid pressure supply means ineffective to cause engagement of the brake and completion of the first power train below a predetermined speed of the driven shaft, a valve controlled by said accelerator and actuated upon movement thereof to its said limit position for rendering said fluid pressure supply means ineffective irrespective of the speed of the driven shaft, and a valve controlled by said lock up means for rendering said fluid pressure supply means ineffective to cause engagement of said brake so long as the power train from the driven shaft to said drive shaft is completed.

3. In transmission mechanism, the combination of a drive shaft, a driven shaft, a planetary gear set including a sun gear, a ring gear drivingly connected with said driven shaft and a planet gear carrier drivingly connected with said drive shaft, a one-way engaging device drivingly connected between said shafts for automatically completing a direct drive from said drive shaft to said driven shaft when the drive shaft drives the driven shaft, a first engaging means between two of the elements of the planetary gear set for completing a two-way direct drive between said shafts, a second engaging means for holding the sun gear stationary to thereby complete a two-way overdrive between said shafts, said one-way engaging device overrunning during the completion of said overdrive and being ineffective during the completion of said two-way direct drive, selectively operable means for effecting an engagement of said first engaging means, means for effecting an engagement of said second engaging means and including a fluid pump driven by one of said shafts, and means for controlling the engagement of said second engaging means and including a first valve normally effective to cause engagement of the second engaging means when the driven shaft speed exceeds a predetermined value, a second valve for overruling said first valve at will and causing disengagement of said second engaging means irrespective of the speed of the driven shaft and a third valve rendered effective when the selectively operable means effects an engagement of the first engaging means to complete said two-way direct drive for causing said second engaging means to remain disengaged.

4. In a system for controlling the driving ratio through a transmission mechanism having a first engaging device disengageable to permit the automatic establishment of a first drive through the transmission mechanism to an output shaft and engageable to complete a second drive through the transmission mechanism to the output shaft and a second engaging device engageable to complete a drive through the transmission mechanism of the same ratio as said first drive, the combination of a fluid pressure operated device for engaging the first engaging device, a source of fluid pressure for operating said fluid pressure operated device, a valve positionable in response to the speed of the output shaft and normally effective when the speed of the output shaft exceeds a predetermined value to connect said pressure source with said fluid pressure operated device to cause engagement of the first engaging device, a manually controlled valve in series with said first-named valve for overruling said first-named valve to cause disengagement of the engaging device at will, and a valve in series with each of said other valves and effective upon the engagement of said second engaging device for also overruling said first-named valve to cause disengagement of the first engaging device.

References Cited in the file of this patent

UNITED STATES PATENTS

| | | |
|---|---|---|
| 1,842,798 | Rauen | Jan. 26, 1932 |
| 2,115,963 | Osborne | May 3, 1938 |
| 2,119,431 | Gommel | May 31, 1938 |
| 2,136,971 | Fleischel | Nov. 15, 1938 |
| 2,177,872 | Dunn | Oct. 31, 1939 |
| 2,241,680 | Taylor | May 13, 1941 |
| 2,311,209 | Carnagua | Feb. 16, 1943 |
| 2,314,554 | Pennington | Mar. 23, 1943 |
| 2,342,960 | Neracher | Feb. 29, 1944 |
| 2,384,448 | Banker | Sept. 11, 1945 |
| 2,398,814 | Taylor | Apr. 23, 1946 |
| 2,437,517 | Greenlee | Mar. 9, 1948 |
| 2,507,051 | Roberts | May 9, 1950 |
| 2,575,522 | McFarland | Nov. 20, 1951 |